Dec. 24, 1946. E. M. MOREHOUSE Re 22,824
SUPPORTING CLIP FOR CONDUITS
Original Filed Nov. 2, 1942
Fig. 1.
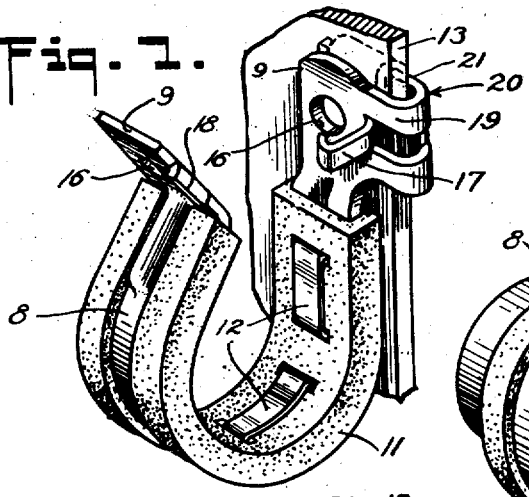
Fig. 2.
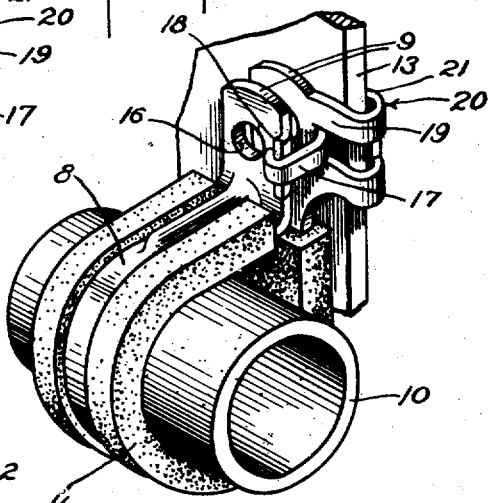
Fig. 3.
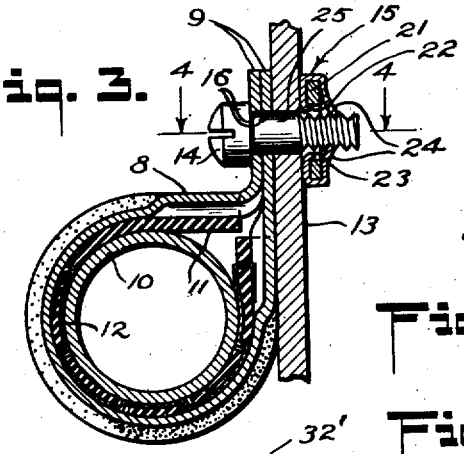
Fig. 4.
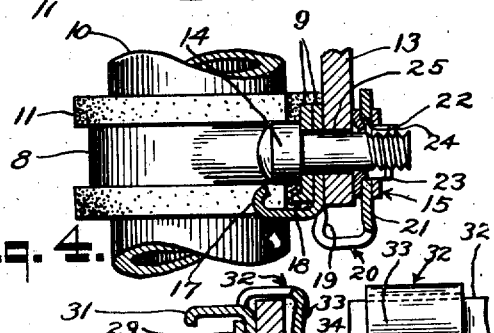
Fig. 5.
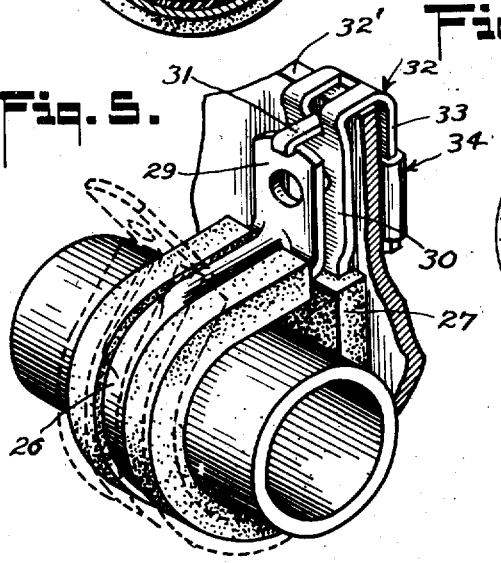
Fig. 6.
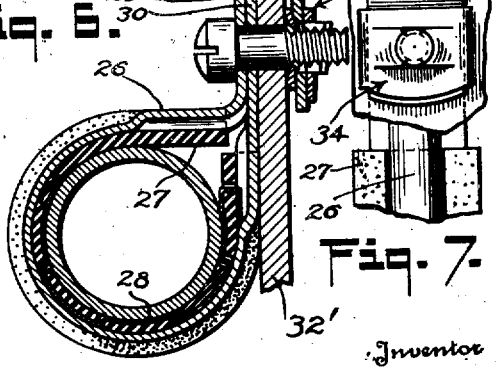
Fig. 7.
Inventor
EUGENE M. MOREHOUSE
By R. S. Berry
Attorney Reissued Dec. 24, 1946 Re. 22,824

UNITED STATES PATENT OFFICE 22,824

SUPPORTING CLIP FOR CONDUITS

Eugene M. Morehouse, Burbank, Calif., assignor to Adel Precision Products Corp., a corporation of California Original No. 2,338,006, dated December 28, 1943, Serial No. 464,276, November 2, 1942. Application for reissue February 23, 1944, Serial No. 523,782

8 Claims. (Cl. 248—74)

This invention relates to conduit supporting clips of the type used in aircraft as shown in United States Letters Patent No. 2,215,283 issued to Paul W. Adler on September 17, 1940, wherein the clip provides a cushioned, vibration-absorbing seat and an electrical bond for a conduit line to protect the line from wear and damage and prevent accumulations of static electricity therein.

A primary object of the present invention is to provide a conduit clip of the character described which is designed to facilitate sub-assembly installations wherein a conduit line before installation has a plurality of clips clamped thereon at the proper spaced intervals and is then installed by securing the clips to structural parts of the aircraft.

Another object is to provide a clip such as described which is provided with a clasp for holding the clip in proper position on a structural part of the aircraft to permit of a ready and easy securing of the clip to such part, either before or after the clip is mounted on the conduit line, thereby making it unnecessary for the operator to hold the clip in place while the operation of finally securing the clip to such part or to the conduit or both is being carried out.

Another object of this invention is to provide a clip of the character described which is provided with clasp or catch means whereby after the clip is mounted on the conduit or the conduit is placed in the clip and it is necessary to bring the apertured ends of the clip together and to hold them in close relation in order to insert a bolt or screw for clamping the clip on the conduit, it is possible to quickly and easily lock said ends in close relation with said latch means and the operator is not then required to hold said ends together during the clamping of the clip or the conduit as well as during the operation of fastening the clip to a structural part of the aircraft.

Another object is to provide a clip such as described wherein latch means on the metal strap thereof serves purposes of holding the clip at the desired point on the conduit line before the clip is finally clamped thereon, and holding the ends of the strap in position to effect the clamping of the clip on the line and the fastening thereof to the airplane structural part.

A further object is to provide a clip such as described which is provided with a nut held thereon in proper position to receive the bolt or screw employed to clamp the clip on the conduit and secure it to the aircraft, thereby making it unnecessary for the operator to hold the nut in place during the installation of the clip.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention and shown as when temporarily mounted on a support and fully open to receive a conduit;

Fig. 2 is a perspective view similar to Fig. 1 but showing the clip with the conduit therein and the ends held by the latch in position to be forced together to properly clamp the clip on the conduit as well as secure the clip to a support;

Fig. 3 is a vertical sectional view of the clip as when finally installed;

Fig. 4 is a cross sectional view taken on the line 4—4 of Fig. 3;

Fig. 5 is a perspective view of a modified form of the invention as to the location of the clasp and latch;

Fig. 6 is a vertical sectional view of the clip shown in Fig. 5;

Fig. 7 is a fragmentary elevational view of the clip shown in Figs. 5 and 6 to show how the nut is carried thereby.

Referring to the drawing more specifically, it is seen that a clip embodying the present invention includes a conduit-embracing strap 8 of resilient or somewhat resilient metal, having opposed apertured and outwardly extended ends 9 which are normally well spaced apart as shown in Fig. 1 to open the strap and permit of the mounting of the clip on conduit 10 or vice versa.

As here shown the strap 8 is lined with a cushion 11 of compressible elastic and insulation material such as rubber, synthetic rubber or similar cushioning material, to serve as a vibration-absorbing seat for the conduit.

A metallic bonding strip 12 is mounted on the cushion 20 so as to be held in contact with the strap and the conduit whereby when the strap is fastened to a metallic structural part of an aircraft such as the part 13 here shown, by means of a bolt 14 and a nut 15, the conduit line will be "grounded" to said structural part, in a manner and for the purpose well known in this art.

In accordance with my invention a latch or lock means is provided on the strap for holding the ends 9 in close relation to one another as shown in Fig. 2. With the ends thus held, the clip is maintained in the desired position on the conduit either before or after the clip is mounted on the airplane structural part 13, thereby making possible an expeditious sub-assembly of clips and a conduit line as well as maintaining the ends 9 in position to easily complete the installation of the clip. This lock means is designed so that when the operator forces the ends 9 from their normally well spaced apart position shown in Fig. 1, to a position in which they are in substantially parallel and somewhat spaced relation with their apertures 16 aligned, they will be automatically latched together and held against springing apart but may be readily forced closer together.

As here provided the latch or lock means comprises a hook member 17 on one of the ends 9, for example, the end that is to be contacted with the structural part 13, arranged to hook around an edge of the opposite end 9 as shown in Fig. 2. To facilitate the locking action the end 9 which is engaged by the hook 17 is provided with an outwardly extending lug 18 adapted to be embraced by the hook 17, as shown in Fig. 2. This lug acts as a cam against the end of the hook 17 as the ends 9 are brought into position shown in Fig. 2, and causes the lug and hook to move past one another and snap into hooked engagement.

As here provided the hook 17 is struck out from one leg 19 of a U-shaped clasp 20 which leg is formed integral with and extends laterally from one longitudinal edge of one of the ends 9. The lug 18 is formed on the corresponding edge of the other leg 9.

The U-shaped clasp has its other leg 21 substantially equal in length to the width of the end 9 plus the length of leg 19, this end 9 being in fact, a part of the leg 19 whereby there is provided a clasp capable of holding the clip in place on the structural part without extraneous fastenings, until the clip is finally bolted in place.

In order to make it unnecessary for the operator to hold a nut in place when installing the clip, the nut 15 is fixed on the leg 21 of the clasp 20 so that the opening in the nut is registered with an opening 22 in the said leg. As shown in Figs. 3 and 4 the nut 16 is of the sheet metal type clipped around the leg 21 and provided with indented end portions 23 extended into the opening 22 to hold the nut with its two opposed spring tongues 24 disposed to threadedly engage the bolt 14.

Assuming the clip has been "hooked" together on a conduit, as shown in Fig. 2, by means of the hook 17 and has been clasped on the structural member 13 by means of the U-shaped clasp 20, with the apertures 16 aligned with the opening 25 in the member 13, the operator may readily insert the bolt 14 to engage the nut 15 and then tighten the bolt to force the ends 9 together and clamp the clip on the conduit and at the same time secure the clip on the member 13 as shown in Figs. 3 and 4.

It is now seen that my improved clip by reason of the latch or lock means for holding the ends of the strap in a predetermined position and for temporarily holding the clip in the desired position on a conduit will simplify and render easier the installation of the clips and conduits, particularly in sub-assembly installations.

The modified form of my invention shown in Figs. 5, 6 and 7 includes a strap 26, cushion 27, bonding strip 28 and apertured end portions 29 and 30 of the same construction and arrangement as in the first described form shown in Figs. 1 to 4 inclusive, but provides the hook member 31 on the outer end of the end portion 30 instead of on the side thereof. This hook is struck out from a U-shaped clasp 32 formed by bending back the strap to form a leg 33 opposite the end portion 30 of the strap. The clasp 32 is adapted to be mounted on the support 32' in the same manner as in the other form of the invention. The hook 31 is adapted to hook over the end edge of the end portion 29 of the strap as shown in Fig. 5. This form is subject to the same uses and installation operations as the form of my invention shown in Figs. 1 to 4 inclusive and differs only as to the location of the hook and clasp.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting a conduit in aircraft, a conduit-embracing strap having ends normally spaced apart to permit of application of the clip to a conduit and adapted to be brought together to clamp the strap on the conduit, latch means operating when said ends are brought into a predetermined position adjacent one another to hold said ends against movement away from one another, said ends having apertures therein for reception of a bolt, a nut, and means on the strap for holding said nut with its opening aligned with the apertures in said ends while the latter are held adjacent one another by said latch means.

2. In a clip for supporting a conduit in aircraft, a conduit-embracing strap having ends normally spaced apart to permit of application of the clip to a conduit and adapted to be brought together to clamp the strap on the conduit, a hook member on one of said ends projecting toward and adapted to be brought into hooked engagement with the other of said ends to hold said ends close to one another for application thereto of a fastening member which is applied to force said ends together and clamp the strap on the conduit, a clasp member on one of said ends for embracing a structural member to support the strap thereon and having an apertured end in opposed spaced relation to one end of the strap, and a fastening means including a fastening member inserted through said ends of the strap and the apertured end of said clasp member and operable for securing said member to a support as well as for clamping the strap around a conduit.

3. In a clip for supporting a conduit in aircraft, a conduit-embracing strap having ends normally spaced apart to permit of application of the clip to a conduit and adapted to be brought together to clamp the strap on the conduit, a hook member on one of said ends projecting toward and adapted to be brought into hooked engagement with the other of said ends to hold said ends close to one another for application thereto of a fastening member which is applied to force said ends together and clamp the strap on the conduit, a clasp member on one of said ends for embracing a structural member to support the strap thereon, a nut carried by said clasp member, and a bolt inserted through said ends and said structural member and engaged with said nut.

4. In a clip for supporting a conduit in aircraft, a conduit-embracing strap having ends normally spaced apart to permit of application of the clip to a conduit and adapted to be brought together to clamp the strap on the conduit, one of said ends being bent back on itself to form a clasp for embracing an edge portion of a structural part of the aircraft to hold the strap thereon, and a hook member struck out from said bent back portion and adapted to hook onto the other of said ends when the ends are brought into a predetermined closely spaced position, to hold said ends against springing apart.

5. In a clip for supporting a conduit in aircraft, a resilient metal conduit-embracing strap having ends normally spaced apart to permit of application of the clip to a conduit and adapted to be brought together to clamp the strap on the conduit, and a hook formed integral with one of said ends and disposed to be brought into hooked engagement with the other end to hold said ends from springing apart when they are brought into a predetermined closely spaced position, one of said ends being bent back to define a U-shaped clasp, said clasp being adapted to be clasped on a structural part of the aircraft to hold the clip thereon, said hook being struck from said bent back portion at the juncture thereof with the said one end.

6. In a clip for supporting an object, a resilient metal object-embracing strap having ends normally spaced apart to permit of application of the clip to the object to be supported thereby and adapted to be brought together to clamp the strap on the object, a hook formed integral with a side edge of one of said ends and extending toward the other of said ends, a lip on the corresponding side edge of the other of said ends arranged to be snapped into hooked engagement with said hook when said ends having apertures spaced from their edges are moved together, and portions on said ends held by said hook and lip with their apertures in alignment for reception of a fastening.

7. In a clip for supporting an object, a resilient metal object-embracing strap having ends normally spaced apart to permit application of the clip to the object to be supported thereby and adapted to be brought together to clamp the strap on the object, a hook on one of said ends, and a lip on the other of said ends arranged to snap into hooked engagement with said hook when said ends are brought into closely opposed relation to one another, said ends having apertures therein spaced from their edges which are held in registration with one another for reception of a fastening while said ends are held together by means of said hook and said lip.

8. A clamp adapted to be assembled about a bundle of wires prior to attachment thereof to a support, comprising a loop of spring metal having at the ends thereof substantially parallel portions, one of said parallel portions having a turned-over part in the shape of a hook, and the other of said parallel portions having a lip thereon for coacting with the hook, whereby direct pressure applied to said second-named end in a direction for fitting the loop to a bundle of wires causes the lip to snap into engagement with the hook, and said ends having registering openings therein for receiving fastening means.

EUGENE M. MOREHOUSE.